United States Patent
Chami et al.

(10) Patent No.: US 10,497,941 B2
(45) Date of Patent: Dec. 3, 2019

(54) CURRENT COLLECTOR HAVING A BUILT-IN SEALING MEANS, BIPOLAR BATTERY INCLUDING SUCH A COLLECTOR, METHOD FOR MANUFACTURING SUCH A BATTERY

(71) Applicant: COMMISSARIAT A L'ENERGIE ATOMIQUE ET AUX ENERGIES ALTERNATIVES, Paris (FR)

(72) Inventors: Marianne Chami, Fontaine (FR); Yvan Reynier, Saint Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 972 days.

(21) Appl. No.: 14/432,688

(22) PCT Filed: Sep. 30, 2013

(86) PCT No.: PCT/IB2013/059015
§ 371 (c)(1),
(2) Date: Mar. 31, 2015

(87) PCT Pub. No.: WO2014/053985
PCT Pub. Date: Apr. 10, 2014

(65) Prior Publication Data
US 2015/0255797 A1    Sep. 10, 2015

(30) Foreign Application Priority Data
Oct. 1, 2012   (FR) .................................. 12 59260

(51) Int. Cl.
*H01M 4/70*   (2006.01)
*H01M 10/04*  (2006.01)
(Continued)

(52) U.S. Cl.
CPC ............... *H01M 4/70* (2013.01); *H01M 4/13* (2013.01); *H01M 4/139* (2013.01); *H01M 4/66* (2013.01);
(Continued)

(58) Field of Classification Search
CPC ............... H01M 4/70; H01M 10/0431; H01M 10/0525; H01M 4/66; H01M 4/139;
(Continued)

(56) References Cited

U.S. PATENT DOCUMENTS 6,664,006 B1   12/2003   Munshi
7,097,937 B2   8/2006    Fredriksson et al.
(Continued)

FOREIGN PATENT DOCUMENTS

EP   1612873   1/2006
EP   2073300   4/2012
(Continued)

OTHER PUBLICATIONS

Office Action issued in Corresponding Japanese Patent Application No. 2015-533752, dated Jun. 9, 2017. (English Translation).

*Primary Examiner* — Lisa S Park
(74) *Attorney, Agent, or Firm* — Norton Rose Fulbright US LLP (57) ABSTRACT

The invention relates to a device for a lithium electrochemical generator, having an elongate shape along a longitudinal axis (X), comprising a strip comprising a current collector central portion that is at least partially electrically conductive, in which at least one of the two main surfaces is covered with an electrode consisting of a lithium insertion material, and at least two side peripheral portions connected to the central portion and extending transversely to the longitudinal axis, the side peripheral portions being made of an electrically insulating material comprising at least one
(Continued)

polymer, the insulating material of at least one of the two side portions being resiliently or plastically deformable, the dimensions of the latter also being determined such as to allow the deformation thereof without breaking during the winding of the strip about a winding axis, which is transverse to the axis (X) and adjacent to the other one of the two side peripheral portions. The invention relates to the method for manufacturing a related bipolar battery.

15 Claims, 4 Drawing Sheets

(51) Int. Cl.
    *H01M 10/0525*     (2010.01)
    *H01M 4/66*     (2006.01)
    *H01M 4/13*     (2010.01)
    *H01M 4/139*     (2010.01)
    *H01M 4/75*     (2006.01)
    *H01M 10/052*     (2010.01)
    *H01M 10/0587*     (2010.01)
    *H01M 4/02*     (2006.01)

(52) U.S. Cl.
    CPC ........... *H01M 4/75* (2013.01); *H01M 10/044* (2013.01); *H01M 10/0431* (2013.01); *H01M 10/052* (2013.01); *H01M 10/0525* (2013.01); *H01M 10/0587* (2013.01); *H01M 2004/029* (2013.01); *Y10T 29/4911* (2015.01)

(58) Field of Classification Search
    CPC .. H01M 10/044; H01M 10/0587; H01M 4/75; H01M 4/13; H01M 10/052; H01M 2004/029; Y10T 29/4911
    See application file for complete search history.

(56) References Cited

U.S. PATENT DOCUMENTS

| | | | |
|---|---|---|---|
| 7,163,765 B2 | 1/2007 | Hosak et al. | |
| 7,220,516 B2 | 5/2007 | Oosawa et al. | |
| 7,279,248 B2 | 10/2007 | Fukuzawa et al. | |
| 7,320,846 B2 | 1/2008 | Watanabe et al. | |
| 7,335,448 B2 | 2/2008 | Kaito et al. | |
| 7,338,733 B2 | 3/2008 | Morita et al. | |
| 7,348,098 B2 | 3/2008 | Hayashi et al. | |
| 2003/0190520 A1 | 10/2003 | Amine et al. | |
| 2003/0224242 A1* | 12/2003 | Kaito | H01M 2/08 429/94 |
| 2005/0284750 A1* | 12/2005 | Nishimura | H01M 2/34 204/252 |
| 2006/0121348 A1 | 6/2006 | Mizutani et al. | |
| 2008/0057392 A1 | 3/2008 | Takamatsu et al. | |
| 2008/0060189 A1 | 3/2008 | Daidoji et al. | |
| 2011/0129722 A1 | 6/2011 | Yoneda | |
| 2013/0089774 A1 | 4/2013 | Chami | |

FOREIGN PATENT DOCUMENTS

| | | |
|---|---|---|
| FR | 2961637 | 12/2011 |
| JP | H06-181058 | 6/1994 |
| JP | H11-121025 | 4/1999 |
| JP | 2000-030746 | 1/2000 |
| JP | 2001-229972 | 8/2001 |
| JP | 2004-095382 | 3/2004 |
| JP | 2004-127559 | 4/2004 |
| JP | 2004-335302 | 11/2004 |
| JP | 2006-302877 | 11/2006 |
| JP | 2010073500 | 4/2010 |
| JP | 2010153224 | 7/2010 |
| JP | 2010218764 | 9/2010 |
| JP | 2011054325 | 3/2011 |
| JP | 2011204386 | 10/2011 |
| WO | WO2003/047021 | 6/2003 |
| WO | WO2006/061696 | 6/2006 |
| WO | WO2010/108956 | 9/2010 |
| WO | WO2011/092938 | 8/2011 |
| WO | WO2011/157751 | 12/2011 |
| WO | WO2012/085515 | 6/2012 |

* cited by examiner

CURRENT COLLECTOR HAVING A BUILT-IN SEALING MEANS, BIPOLAR BATTERY INCLUDING SUCH A COLLECTOR, METHOD FOR MANUFACTURING SUCH A BATTERY

CROSS-REFERENCE TO RELATED APPLICATIONS

This application is a national phase application under 35 U.S.C. § 371 of International Application No. PCT/IB2013/059015 filed 30 Sep. 2013, which claims priority to French Patent Application No. 12 59260 filed 1 Oct. 2012. The entire contents of each of the above-referenced disclosures is specifically incorporated herein by reference without disclaimer.

TECHNICAL FIELD

The present invention relates to the field of lithium-ion electrochemical generators, which function according to the principle of insertion or deinsertion, or in other words intercalation/deintercalation, of lithium ions in at least one electrode.

It more particularly relates to a lithium-ion electrochemical accumulator comprising at least one bipolar current collector, also referred to as a bipolar battery. In such a bipolar battery, the bipolar collector bears on each of its opposite faces one of two oppositely signed electrode materials, i.e. a cathode (positive electrode) borne by one of the faces and an anode (negative electrode) borne by the other of the opposite faces.

The invention deals with the production by winding of a lithium-ion bipolar battery, its compartments having in the end a satisfactory seal tightness with respect to electrolyte in liquid form.

PRIOR ART

The architecture of conventional lithium-ion batteries is an architecture that may be qualified monopolar, because a single electrochemical cell comprises an anode, a cathode and an electrolyte. A plurality of types of monopolar architecture geometry are known:
- a cylindrical geometry such as disclosed in patent application US 2006/0121348;
- a prismatic geometry such as disclosed in patents U.S. Pat. Nos. 7,348,098, 7,338,733; and
- a stack geometry such as disclosed in patent applications US 2008/060189 and US 2008/0057392, and patent U.S. Pat. No. 7,335,448.

A monopolar architecture is produced by winding. The winding consists of a current collector on which a positive electrode material (cathode) is continuously deposited, a separator made of a ceramic or polymer material being inserted between a negative electrode material (anode) itself deposited on another current collector. The main advantage of this monopolar architecture is that it has a large active material area, but the potential difference is restricted to the unitary value of the potential difference between the two electrode materials used, which is also the case for the stack geometry.

In order to increase the average potential of a monopolar Li-ion accumulator while preserving a comparable energy density, it is known to produce a battery with a plurality of electrochemical cells in series. The architecture of the battery is thus qualified bipolar because it comprises a cathode of a cell and an anode of an adjacent cell that are borne on a given current collector taking the form of a plate, itself qualified a bipolar electrode. The architecture of a bipolar battery thus corresponds to a plurality of monopolar accumulators placed in series by way of bipolar current collectors or electrodes, with however the advantage of having a low electrical resistance relative to monopolar accumulators connected in series by external connectors. Mention may be made here of many patents or patent applications relating to such bipolar batteries, such as U.S. Pat. Nos. 7,279,248, 7,220,516, 7,320,846, 7,163,765, WO 03/047021, WO 2006/061696 and U.S. Pat. No. 7,097,937.

The subsequent advantages of a bipolar battery are that it has a lower mass and does not comprise unnecessary volumes.

The main difficulty with designing a bipolar battery is the production of compartments that are perfectly leak-tight to the electrolyte, in general a liquid, one with respect to the others. Specifically, a poor seal tightness leads to ionic short-circuits that cause the bipolar battery to malfunction.

This is moreover corroborated by the fact that the majority of the patent literature relating to the field of bipolar Li-ion batteries concerns sealing solutions, also called seals, for preventing leakage of electrolyte from one compartment to another (ionic short-circuits). Whatever the sealing system employed, it must:
- be chemically resistant to the liquid electrolyte, for example consisting of a solution of $LiPF_6$ lithium salt in a solvent mixture of ethylene carbonate (EC) and dimethyl carbonate (DMC);
- be easy to implement: specifically, during the operations of stacking the various constituent elements of a bipolar battery, application of the seal must be compatible with an industrial manufacturing line and be achieved at relatively low temperatures generating little or no degradation of the electrodes, of the separator or even of the electrolyte; and
- guarantee total seal tightness over the long-term.

Among the patents or patent applications cited above, mention may be made of patent U.S. Pat. No. 7,220,516 which describes a solution employing a flexible adhesive film 5, 6 adhesively bonded to the periphery of the bipolar collector.

Mention may also be made of patent U.S. Pat. No. 7,320,846 which describes a solution involving encapsulating the collectors 4 and the electrolytes 6 in a resin 10.

Mention may also be made of patent U.S. Pat. No. 7163765 which describes a sealing solution with mixed spacers 9 made of polyamide/polypropylene PP arranged between bipolar collectors, the polyamide being welded directly to the periphery of the collectors at distance from the cells.

Patent U.S. Pat. No. 7,097,937 for its part proposes a double sealing solution since an interior barrier 14, 22 made of fluoropolymer is arranged on the periphery of the bipolar collector 11, and an exterior frame 18, 23 made of elastomer is arranged outside the barrier 14, 22 on and around the bipolar collector, an additional elastomer ring 15 optionally being arranged on the collector 11.

Mention may further be made of patent application EP 2073300 in the name of the Applicant, which proposes a solution according to which the dimensions of the plates are increased one relative to the adjacent other and the seals interposed between the interconnecting plates are offset transversely in order for two seals not to be located in line with each other along the stacking axis of the cells.

Mention may also be made of patent application JP 2010153224 which describes producing a bipolar battery with each bipolar current collector 1 consisting of a polymer filled with particles made of conductive material, the seal being obtained using a bead of resin 31 on the periphery of and on the face of each bipolar collector 1. Patent application JP2011204386 also discloses a bipolar battery of this type with a bipolar collector 1 made of a filled polymer, said collector 1 being sealed with a peripheral bead 2 made of resin by hydrogen bonding by means of an intermediate adhesive layer. A bipolar battery according to the teachings of these applications cannot actually be envisioned for an application in which it is sought to deliver a high power via the battery. In particular, the bipolar current collector 1 envisioned has a low electronic conductivity and a high electrical resistance.

Patent application JP2010073500 also discloses producing a bipolar battery with a bipolar current collector consisting of metal particles 2a in a polymer binder 2b. Various other patent applications, such as JP 2010218764, JP2011054325 and WO2011092938 furthermore describe the possibility of filling the polymer with conductive particles in order to limit, as best as possible, the diffusion of lithium ions.

Mention may lastly be made of patent application WO 2011/157751 which describes a solution for integrating polymer-based sealing means into a metal sheet or grid having a current collector function.

Thus, the solutions envisioned in the prior art for improving the seal tightness between compartments with respect to the electrolyte in a Li-ion bipolar battery may be summarized as follows:

systematically producing the bipolar current collector, also referred to as a bipolar electrode, in the form of a plate or from a polymer filled with particles made of a conductive material;

using various resins or adhesives on the periphery of the plate or of the polymer filled with particles made of a conductive material;

increasing the format of the bipolar current-collector plate in order to create an additional barrier to the electrolyte; and integrating polymer-based sealing means into a metal sheet or grid having a current collector function.

All these sealing solutions already envisioned for bipolar batteries have in common that they were thought of only for a stacked bipolar element geometry.

Now, producing a Li-ion bipolar battery architecture by winding while providing a reliable sealing solution would have the additional advantage of making it possible to increase the area of the electrodes and therefore the capacity of the bipolar battery. In other words, a bipolar battery produced by winding could meet the requirements of applications requiring a high power to be delivered that offer only a limited volume for accommodating said battery, in particular portable tools.

Various wound bipolar batteries have already been proposed.

Thus, patent U.S. Pat. No. 6,664,006 proposes to produce a bipolar battery using conventional initial steps to produce the bipolar collectors, and to stack and seal the associated electrochemical compartments, then a winding step, i.e. a step of winding the electrochemical compartments with stacked bipolar collectors that are already sealed tight. This solution is not actually envisionable. Specifically, the electrochemical compartments containing the bipolar collectors all have a generally parallelepipedal (rectangular or square) shape, the sealing zone being a frame arranged on the periphery of the active portion of the electrodes. Stacking a large number of compartments with their bipolar collectors increases the thickness of the battery. Thus, if this seal-tight stack is wound, the radii of curvature to which the compartments are bent are different: the radius of curvature of the compartment in the central portion is especially very much smaller/very much larger than that of the compartment on the larger/smaller periphery of the stack, respectively. This means that there is a substantial risk of the sealing frame being subjected to very different stresses, and therefore a risk of rupture zones being created. Thus, it is not possible to envision winding a bipolar battery comprising stacked bipolar compartments while preserving the seal tightness thereof obtained beforehand using a peripheral sealing frame such as described in patent U.S. Pat. No. 6,664,006.

Patent application WO 2010/108956 for its part discloses production by successive, side-by-side juxtaposition of bipolar compartments by means of a common bipolar collector formed from one and the same metal carrier. By using metal carriers that are flexible, it is then possible to orient the compartments relative to one another and therefore to tailor the final shape of the bipolar battery, which in particular takes the form of a wound package. This solution has the major drawback that the area of the collector-bearing metal carrier to be employed is large relative to the active area dedicated to the electrodes. Furthermore, production of a plurality of bipolar elements on a given current-collector carrier may prove to be tricky because of the fragility of the carrier during the procedure.

The general aim of the invention is to provide a solution for winding a Li-ion bipolar battery other than those already envisioned in the prior art, which makes it possible to envision high-power applications even when only a limited volume is available for accommodating the battery, while being industrially applicable and reliable.

One particular aim is to provide a solution for winding a bipolar battery, which allows a good seal tightness to be preserved between compartments with respect to the electrolyte, in particular the liquid electrolyte, once the winding has been carried out and without increasing the actual area of the current collectors.

SUMMARY OF THE INVENTION

To do this, one subject of the invention is a device for a lithium-ion electrochemical generator, of elongate shape along a longitudinal axis X, comprising a band comprising a central portion, which is at least electrically conductive in part, forming a current collector at least one of the two main faces of which is covered with an electrode made of a lithium-ion insertion material, and at least two lateral peripheral portions connected to the central portion and extending transversely to the longitudinal axis, the lateral peripheral portions being made of an electrically insulating material comprising at least one polymer, the insulating material of at least one of the two lateral portions being able to be elastically or plastically deformed, the dimensions of said one of the two lateral portions furthermore being defined to allow its deformation without rupture during a coiling of the band around a coiling axis Y that is transverse to the longitudinal axis X and in proximity to the other of the two lateral peripheral portions.

According to the invention, a current collector carrier band is produced at least one sealing portion of which is elastically or plastically deformable in order to be able to undergo the tensile stresses during the winding without there being any risk of the seal tightness to the electrolyte decreasing. The dimension of the deformable portion made of polymer in the coiling direction, i.e. in the direction of the longitudinal axis X, is advantageously chosen depending on the number of stacked compartments that form in the end the bipolar battery once the winding has been carried out. The larger the number of stacked compartments to be wound, the greater the radius of curvature (and therefore the stretching) of the outermost carrier band of the current collector of the coil, i.e. of the collector that is initially located on top of the stack. In other words, before the coiling (winding) is carried out a dimension is determined for the deformable part, said dimension being large enough that the part is able to undergo the tensile stresses during the winding without running the risk of rupturing.

Surprisingly, although simple to produce, the solution according to the invention has never been envisioned for the winding of bipolar batteries.

By virtue of the invention, it is possible to wind electrochemical compartments with bipolar electrodes as if there were only a single thickness to be wound.

Contrary to the solutions for winding bipolar batteries according to the prior art, such as those described in patent applications WO 2010/108956 and US 2003/0190520, it is not necessary according to the invention to juxtapose bipolar compartments or to offset them relative to one another.

By virtue of the invention, it is possible to provide bipolar batteries delivering twice the voltage of monopolar batteries in a dedicated accommodating volume that is identical.

Thus, the device according to the invention makes it possible to preserve the actual seal tightness of a bipolar battery during its winding. It is therefore possible to envision using for high powers bipolar batteries integrating by winding devices according to the invention in an accommodating volume up to now dedicated to the accommodation of monopolar batteries.

A particularly advantageous application that the invention may target is the provision of high-power bipolar batteries for apparatuses that have only a small volume available for accommodating the battery, in particular portable tools such as strimmers.

The peripheral portion made of deformable polymer may be connected to the central portion that is conductive at least in part by welding, adhesive bonding, heat sealing, etc.

The majority polymer of the insulating material that is able to be deformed may be chosen from a polyolefin, a nitrile rubber (NBR) and a styrene butadiene rubber (SBR). Preferably, the polyolefin is chosen from a polyethylene (PE), a polypropylene (PP), a polyimide and a polyetheretherketone (PEEK). Polymers that are already tried and tested constituents of flexible Li-ion battery packaging may thus be chosen, such as the packaging sold by Showa Denko under the commercial reference N° ADR-ON25/AL40/CPP40 or N° ADR-ON25/AL40/CPP80.

According to one advantageous embodiment, the electrically conductive part may consist of at least one metal sheet, the lateral peripheral portions made of insulating material being sealed to said metal sheet.

According to this embodiment, the metal sheet may be sealed to a single frame made of an electrically insulating material that is able to be deformed, said frame completely encircling the metal sheet.

Alternatively, the metal sheet may be sealed to a frame made of an electrically insulating material having a U-shape as seen from in front, encircling the metal sheet except for the lateral portion dimensioned for its deformation, and to said lateral portion made of material able to be deformed, respectively.

According to another embodiment, the band itself may be made of an electrically insulating material that is able to be deformed, the electrically conductive part then consisting of electrically conductive particles embedded in the band. The conductive particles may be carbon particles, metal beads, etc. Care will of course be taken to ensure that the electrically conductive particles connect the two faces of a current collector. The addition of conductive particles has the effect of strengthening the polymer of the band and of making it impossible or very difficult to deform in the active zone of the electrodes.

According to this other embodiment, the band is mechanically reinforced at its periphery, except for the lateral portion dimensioned for its deformation, by non-conductive electrical particles. Thus, it is possible to increase the rigidity of the electrically insulating band in the locations where the deformation is not desired during the winding.

A device according to the invention may have a thickness comprised between 10 and 100 µm and preferably between 25 and 50 µm.

A device according to the invention may have any geometric shape, such as a section of polygonal shape, for example a rectangle or a square, with a zone devoid of metal layers as defined above arranged on the periphery.

Planar dimensions of length comprised between 40 and 70 cm, typically of about 50 cm, and a width comprised between 10 and 25 cm, typically about 15 cm, may be envisioned. The peripheral zone devoid of the electrically conductive portion, and that comprises the peripheral portion able to be deformed according to the invention, may advantageously form a frame of width comprised between 1 mm and 10 cm, more particularly between 3 mm and 12 mm and typically about 5 mm. Thus, the peripheral zone may cover a surface area lower than 25% of the total surface area of the device, preferably lower than 20% and even more preferably lower than 15%.

Depending on the type of lithium-ion insertion electrode materials chosen, the current collector formed by at least one metal sheet may be made of aluminum or metalized on the surface of another metal, for example of aluminum superposed on copper.

When the collector of the current of the device is intended to be bipolar, each main face of the electrically conductive part is covered with an electrode made of a lithium-ion insertion material.

The expression "electrode made of a lithium-ion insertion material" is here and in the context of the invention understood to mean an electrode comprising at least one lithium-ion insertion material and at least one polymer binder. Optionally, the electrode may in addition comprise an electronic conductor, for example carbon fibers or carbon black.

The expression "lithium-ion insertion material", in particular for the positive electrode, is here and in the context of the invention understood to mean a material chosen from spinal lithiated oxides containing manganese, lamellar lithiated oxides, and mixtures thereof, and polyanionic framework lithiated oxides of formula $LiM_y(XO_z)_n$ where M represents an element chosen from Mn, Fe, Co, Ni, Cu, Mg, Zn, V, Ca, Sr, Ba, Ti, Al, Si, B and Mo and X represent an element chosen from P, Si, Ge, S and As, y, z and n being positive integers.

The expression "lithium-ion insertion material", in particular for the negative electrode, is also understood to mean a material chosen from: a lithiated or non-lithiated titanium oxide, for example $Li_4Ti_5O_{12}$ or $TiO_2$. More particularly, the negative electrode material may be chosen from carbonated materials, non-lithiated titanium oxides and their derivatives and lithiated titanium oxides, such as $Li_4Ti_5O_{12}$, and their derivatives, and a mixture thereof.

The expression "lithiated derivative" is here and in the context of the invention understood to mean compounds of formula $Li_{(4-x1)}M_{x1}Ti_5O_{12}$ and $Li_4Ti_{(5-y1)}N_{y1}O_{12}$, where x1 and y1 are respectively comprised between 0 and 0.2 and M and N are respectively chemical elements chosen from Na, K, Mg, Nb, Al, Ni, Co, Zr, Cr, Mn, Fe, Cu, Zn, Si and Mo.

The expression "non-lithiated derivative" is here and in the context of the invention understood to mean $Ti_{(5-y1)}N_{y1}O_{12}$, where y1 is comprised between 0 and 0.2 and N is a chemical element chosen from Na, K, Mg, Nb, Al, Ni, Co, Zr, Cr, Mn, Fe, Cu, Zn, Si and Mo.

When the current collector of the device is intended to be monopolar, only one of the two main faces of the electrically conductive portion is covered with an electrode made of a lithium-ion insertion material.

The invention also relates to a bipolar battery comprising at least two electrochemical cells coiled on one another and at least one device such as described above, in which the two lateral peripheral portions made of electrically insulating material form a peripheral zone of a wall leak-tight to the electrolytes of the two cells, which encircles the latter.

Preferably, the anodes are made of $Li_4Ti_5O_{12}$ and the cathodes of $LiFePO_4$.

The invention also relates to a process for producing a bipolar battery comprising at least two electrochemical cells coiled on one another, comprising the following steps:

a/ producing two bipolar devices such as described above, so that:
- at least one of the two faces of the electrically conductive part of one of the devices is covered with an anode made of a lithium-ion insertion material; and
- at least one of the two faces of the electrically conductive part of the other of the devices is covered with a cathode made of a lithium-ion insertion material;

b/ stacking the two devices with insertion of a first separator; the stacking with insertion being carried out so that an anode of one of the two bipolar devices described above is facing a cathode of the other bipolar device described above, said anode and cathode being separated by the first separator;

c/ sealing only between the lateral peripheral portions of the bands of the two devices stacked one against the other, thus defining two sealed portions of the stack;

d/ fastening one of the sealed portions of the stack to a coiling core so that its axis Y forms a coiling axis that is transverse to the longitudinal axis X of the bands; and e/ coiling the stack in the direction of the longitudinal axis X about the coiling axis Y, that sealed portion of the stack which is not fastened to the core being held.

The term "separator" is here and in the context of the invention understood to mean an electrically insulating ionic conductor formed by at least one polymeric material such as polyvinylidene fluoride (PVDF), polyvinyl acetate (PVA), polymethyl methacrylate (PMMA), polyoxyethylene (POE) or polyethylene terephthalate (PET) or a polymer chosen from the polyolefins such as polypropylene, polyethylene and cellulose.

The electrolyte according to the invention may be a liquid formed by a carbonate mixture and at least one lithium salt. The expression "lithium salt" is preferably understood to mean a salt chosen from $LiPF_6$, $LiClO_4$, $LiBF_4$ and $LiAsF_6$.

Alternatively, the electrolyte may comprise one or more ionic liquids based on lithium ions, namely a salt formed from lithium cations complexed with organic or inorganic anions, which has the property of being a liquid at room temperature. An ionic liquid, depending on the nature of the anion, may be hydrophilic or hydrophobic. By way of example of ionic liquids, mention may be made of ionic liquids based on hydrophobic anions such as trifluoromethanesulfonate ($CF_3SO_3$), bis(trifluoromethanesulfonate)imide [$(CF_3SO_2)_2N$] and tris(trifluoromethanesulfonate)methide [$(CF_3SO_2)_3C$].

The process for producing by winding into a coil a high-capacity bipolar battery according to the invention is particularly advantageous since it makes it possible to coil (wind) all the compartments of the battery as though there were only one single thickness to be wound and without running the risk of decreasing the seal tightness of the battery.

In particular, the advantageousness of this implementation increases in proportion to the number of bipolar compartments of the bipolar battery. This is because, at the current time, to achieve industrially the coiling of a monopolar lithium-ion battery, a machine is used that necessarily employs four unwinding systems, namely two for the separators and two for the positive and negative electrodes, and an aligning system that allows each unwound element to be aligned relative to the others. Thus, using the same type of machine to achieve the coiling of a bipolar battery would amount to designing a machine with a consequent number of unwinders and aligning systems, i.e. a very complicated machine. By way of example, for a bipolar battery with a number equal to twelve bipolar compartments, it would be necessary to design a machine with forty-eight unwinding systems and as many aligning systems, which is technically unrealistic.

According to one advantageous variant, when the two electrodes, at the ends of the stack and coiled one against the other, are of the same polarity, a step c1/ of covering the stack with a film made of an electrically insulating material is carried out before step d/.

According to one alternative variant, when the two electrodes, at the ends of the stack and coiled one against the other, are of opposite polarity, the following steps are carried out before step d/:

c2/ a second separator is placed on the cathode or anode made of a lithium-ion insertion material at the end of the stack; and c3/ the second separator is mechanically held on the stack.

To finalize the bipolar battery, i.e. to get it into a form ready to be used, provision is made, once step e/ has been carried out, for carrying out the following subsequent steps:

f/ packaging of the coil using a packaging film made of an electrically insulating material in order to maintain mechanically said coil in the shape of a cylinder;

g/ sealing the lower portion of the cylinder corresponding to one of the longitudinal peripheral portions of the bands;

h/ inserting the cylinder with the sealed lower portion into a rigid container of complementary cylindrical shape, the rigid container forming the packaging of the battery;

i/ impregnating the separators with a liquid electrolyte introduced into the container; and j/ sealing the upper portion of the cylinder corresponding to the other of the longitudinal peripheral portions of the bands.

Preferably, each of the two terminal current collectors, which both take the form of a foil, is welded to the electrically conductive portion of one of the current collectors of the bipolar devices described above, in step a/.

According to one embodiment of the invention, a bipolar battery comprising n electrochemical cells stacked individually on one another may be produced by carrying out the aforementioned steps a/ to f/ with (n−2) devices each with an electrode on each face, n being an integer.

The deposition of each electrode on the electrically conductive portion forming a current collector of at least one of the devices may be achieved using a conventional printing technique such as screen printing, rotogravure printing, flexographic printing, spray printing, etc.

DETAILED DESCRIPTION

Other advantages and features will become more clearly apparent on reading the detailed description, given by way of illustration with reference to the following figures in which.

For the sake of clarity, the same references have been used to designate the same elements of bipolar batteries according to the prior art and according to the invention in all of FIGS. 1 to 6B.

It will be noted that the various elements according to the invention are shown merely for the sake of clarity and that they are not to scale.

Figure 1:
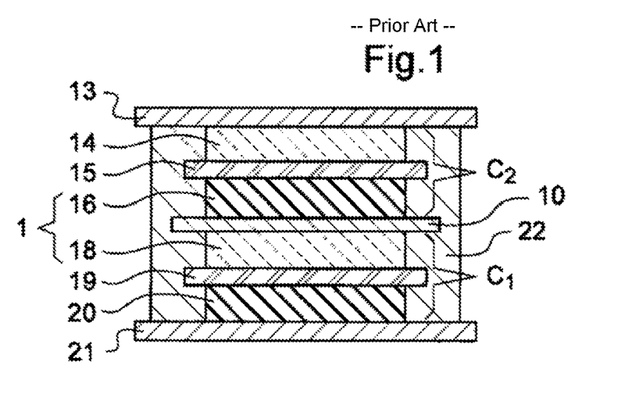
FIG. 1 is a schematic longitudinal cross-sectional view of a lithium-ion bipolar battery according to the prior art.

A Li-ion bipolar battery according to the prior art has been shown in FIG. 1, such as it is illustrated in patent application WO 03/047021. The top part of this battery comprises a conductive aluminum substrate 13 (positive terminal current collector) and an active layer 14 based on a positive lithium-ion insertion material, such as $Li_{1.04}Mn_{1.96}O_4$, and the bottom part comprises a conductive aluminum substrate 21 (negative terminal current collector) and an active layer 20 based on a positive lithium-ion insertion material, such as $Li_4Ti_5O_{12}$.

In this battery, a bipolar electrode 1, also referred to as a bipolar current collector, comprises an anode layer 16 and a cathode layer 18 on either side of a conductive aluminum substrate 10 taking the form of a plate. The lower electrode 20 and the upper electrode 14 are separated from the bipolar electrode 1 by two separators 15, 19, in which an electrolyte is present in liquid or gel form. The seal tightness to the electrolytes of the battery between the two adjacent electrochemical cells formed 14, 15, 16 and 18, 19, 20 is ensured by a seal 22 that is produced by depositing a resin or adhesive on the periphery of all the electrodes and the plate 10.

Figure 2A:
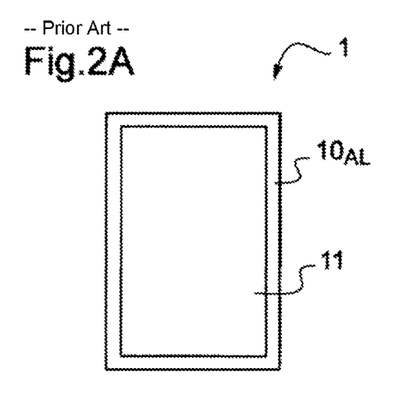
FIGS. 2A and 2B are a front and cross-sectional view, respectively, of a bipolar current collector used in a lithium-ion bipolar battery according to the prior art.
Figure 2B:
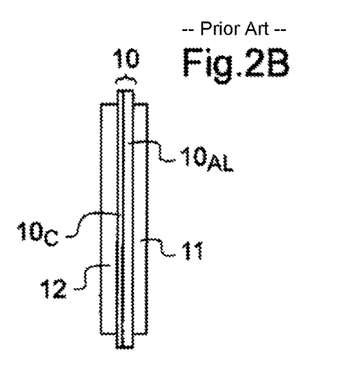
Figure 3A:
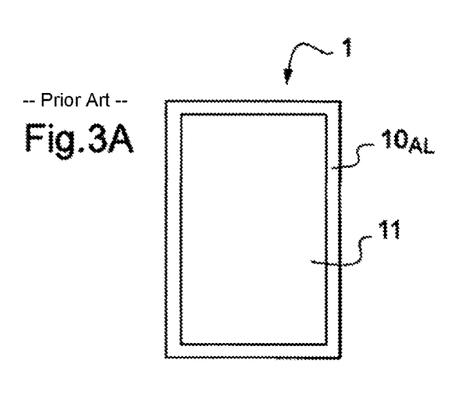
FIGS. 3A and 3B are a front and cross-sectional view, respectively, of another bipolar current collector used in a lithium-ion bipolar battery according to the prior art.
Figure 3B:
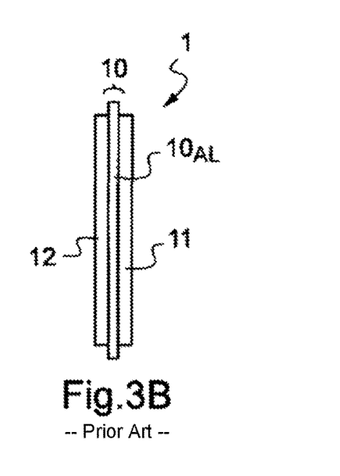

A bipolar current collector 10 according to the prior art is, depending on the lithium-ion insertion materials employed to produce the electrodes:

either made up of two superposed plates, one of which $10_{AL}$, typically made of aluminum, is covered by a cathode 11 and the other of which $10_C$, typically made of copper, is covered by an anode 12 (FIGS. 2A and 2B);

or made up of a single plate $10_{AL}$, typically made of aluminum, covered on one of its faces by a cathode 11 and on the other of its faces by an anode 12 (FIGS. 3A and 3B). The main difficulty encountered when designing a stacked bipolar battery according to the prior art is how to produce compartments that are perfectly seal tight to the electrolyte, in general a liquid, one relative to the others, such as between the two cells C1 and C2, i.e. between the compartments referenced 14, 15, 16 and 18, 19, 20 in FIG. 1.

A bipolar current collector 10 according to the prior art, depending on the lithium-ion insertion materials employed to produce the electrodes, is:

either made up of two superposed plates, one of which $10_{AL}$, typically made of aluminum, is covered by a cathode 11 and the other of which $10_C$, typically made of copper, is covered by an anode 12 (FIGS. 2A and 2B);

or made up of a single plate $10_{AL}$, typically made of aluminum, covered on one of its faces by a cathode 11 and on the other of its faces by an anode 12 (FIGS. 3A and 3B). The main difficulty encountered when designing a bipolar battery according to the prior art is how to produce compartments that are perfectly seal tight to the electrolyte, in general a liquid, one relative to the others, such as between the two cells C1 and C2, i.e. between the compartments referenced 14, 15, 16 and 18, 19, 20 in FIG. 1.

Thus, the bipolar battery 1 according to the prior art is a stacked bipolar battery because the cells C1 and C2 (compartments 14, 15, 16 and 18, 19, 20) are in the end in the battery stacked on one another.

The inventors were confronted with the need to provide a bipolar battery for applications requiring delivery of high powers in which only a small volume is available for accommodating said battery, in particular portable tools such as strimmers.

They thus thought to produce a bipolar battery by winding because this makes it possible to increase the area of the electrodes and therefore the capacity of the bipolar battery. However, the solutions proposed in the prior art are either not industrially applicable or unreliable in terms of their seal tightness with respect to the electrolyte.

The inventors thus envisioned a solution that is simple to implement, namely providing each bipolar element of the battery with a zone of electrically insulating material dedicated to sealing that furthermore is able to be deformed in order to be able to undergo the mechanical tensile stresses exerted during the winding without running the risk of rupturing, the maintenance of seal tightness during the winding (coiling) thus being guaranteed.

Figure 4A:
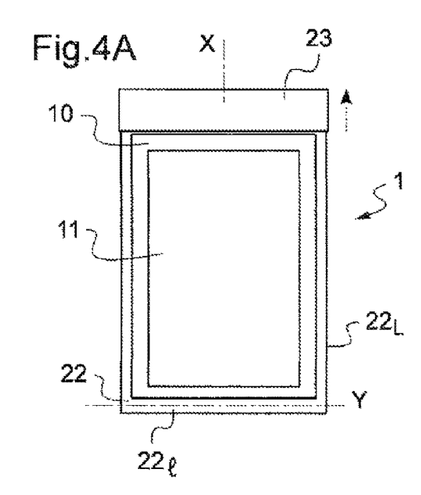
FIGS. 4A and 4B are a front and cross-sectional view, respectively, of a bipolar-electrode device for producing a lithium-ion bipolar battery according to the invention.
Figure 4B:
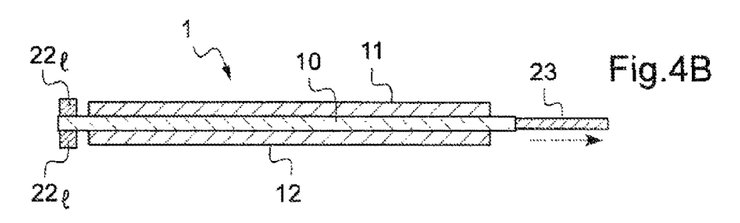

Thus, according to the invention, provision is made to produce a device for a bipolar battery, with a bipolar electrode 10, 11, 12, said device being such as shown in FIGS. 4A and 4B. The device of elongate shape along the longitudinal axis X comprises a band 1 of generally rectangular shape.

This band comprises a central portion 10 that is at least electrically conductive in part, said portion forming the current collector the two main faces of which are respectively covered with a cathode 11 and an anode 12.

It also comprises at least two lateral peripheral portions 221 and 23 connected to the central portion 10 and extending transversely to the longitudinal axis X. The lateral peripheral portions 221, 23 are made of an electrically insulating material comprising at least one polymer, the insulating material of at least the lateral portion 23 being able to be elastically or plastically deformed. The majority polymer of the insulating material of the deformable lateral portion 23 may be chosen from a polyolefin, a nitrile rubber (NBR) and a styrene butadiene rubber (SBR). The polyolefin is advantageously chosen from a polyethylene (PE), a polypropylene (PP), a polyimide and a polyetheretherketone (PEEK).

According to the invention, the dimensions of the lateral portion 23 are furthermore defined in order to allow its deformation without rupture during a coiling of the band around a coiling axis transverse to the longitudinal axis X. This transverse axis is depicted by the axis Y, and it is located in proximity to the lateral peripheral portion 221.

Thus, as described in greater detail below, when a plurality of devices (i.e. bipolar compartments) that have already been made seal tight at least in part by bonding, on the one hand, lateral portions 221, and on the other hand, lateral portions 23, are stacked on one another and wound around the coiling axis Y, the tensile stresses experienced by each of the deformable portions 23 mean that the latter stretch without running the risk of tearing (rupture) and therefore without decreasing seal tightness.

According to a first embodiment, the central portion 10 may consist of a metal sheet, typically made of aluminum as shown in FIGS. 4A and 4B. The lateral portion 23 according to the invention is then sealed, and may then either be welded, or adhesively bonded or heat sealed to the metal sheet.

Figure 5A:
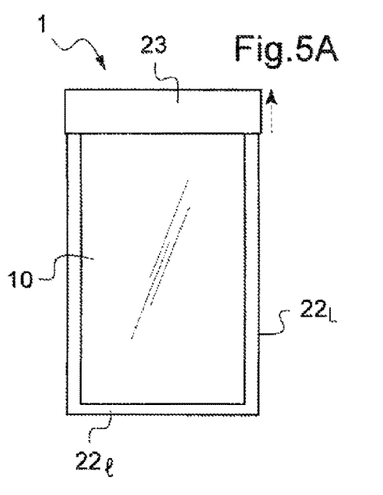
FIGS. 5A to 5C illustrate front views of different variant embodiments of a bipolar-electrode device according to the invention.

The metal sheet 10 may be sealed to a frame made of an electrically insulating material 22 having a U-shape as seen from in front, which encircles said sheet except for the lateral portion 23 dimensioned for its deformation. Thus, as shown in FIGS. 4A, 4B and 5A, the U-shaped frame 22 comprises the lateral peripheral portion 221 and two longitudinal peripheral portions 22L. Eventually, all the peripheral portions 221, 22L of the frame 22 and the deformable portion 23 form one of the seal-tight walls of the bipolar battery.

Figure 5B:
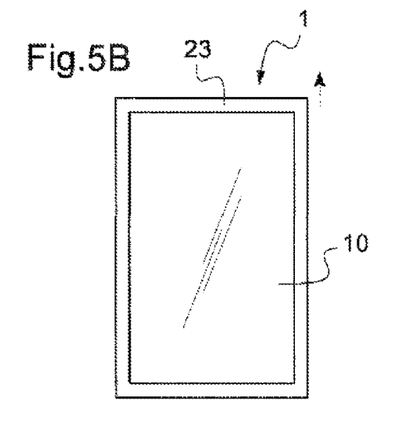

Alternatively, the metal sheet 10 may be sealed to a single frame 23 made of an electrically insulating material that is able to be deformed, which frame 23 completely encircles said sheet 10 (FIG. 5B). Thus according to this variant, provision is made for one and only one peripheral sealing element 23 per device.

Figure 5C:
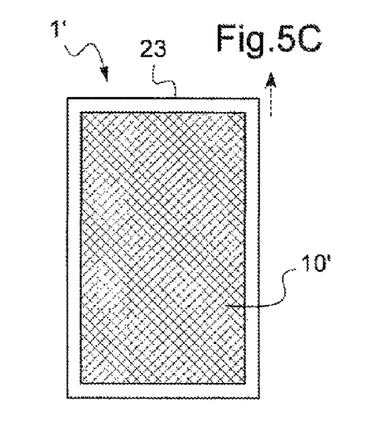

According to a second embodiment, the band itself 1' may consist of an electrically insulating material incorporating the deformable lateral portion 23, the conductive part 10' then consisting of electrically conductive particles (FIG. 5C). The conductive particles may especially be carbon particles or metal beads, etc. Whatever the material, the shape and size of these particles 10', care is taken that, when embedded in the band 1', the conductive particles 10 connect the two main faces so as to ensure the electrical continuity between the latter. Although not shown, other variants may be provided: in particular, provision may be made to reinforce the polymer-based material of the band 1' with electrically non-conductive particles, except for in the deformable peripheral portion 23.

In FIGS. 6A to 9D, a process for producing by winding a bipolar battery according to the invention has been illustrated, each of the unitary devices 1 being produced according to the first embodiment, i.e. with a current collector formed by a metal sheet 10, and according to the variant employing a single sealing frame 23 on the periphery of the metal sheet 10.

More precisely, complete production of a coiled bipolar battery comprising two bipolar compartments according to the invention to the standard format known by the designation 18650 has been illustrated.

By way of illustrative example, the technical features of this bipolar battery are the following:
nominal electrical voltage=3.8 V (2×1.9 V), capacity=0.4 Ah;
dimensions of the finalized battery with its rigid packaging (case): 18×65 mm;
positive electrodes 11: LiFePO$_4$ (LFP), 90% active material, porosity 40%, weight per unit area 7 mg/cm$^2$;
negative electrodes 12: Li$_4$Ti$_5$O$_{12}$ (LTO), 89% active material, porosity 40%, weight per unit area 8 mg/cm$^2$;
current collectors 10: 1085 aluminum;
microporous separator 24 for the liquid electrolyte: polypropylene/polyethylene/polypropylene (PP/PE/PP) trilayer material with 50% porosity; dimensions: thickness of 21.5 µm, width of 55 mm and length of 450 mm;
sealing frame 23: polypropylene (PP);
length Lt of the battery before it is packaged: 480 mm;
width lt of the battery before it is packaged: 60 mm;
thickness Et of the battery before it is packaged: 506 µm;
length L0 of the lithium-ion insertion material: 410 mm; and
width lo of the lithium-ion insertion material: 49 mm.

The initial stack of the bipolar battery according to the invention consists of a positive monopolar electrode 1+, a negative monopolar electrode 1− and two identical bipolar-electrode devices 1 according to the invention.

Each of the monopolar electrodes 1+, 1− is of generally rectangular shape and may be qualified bifacial since it is coated on each of its two faces with a lithium-ion insertion material that is either positive (cathode 11), or negative (anode 12).

Figure 6A:
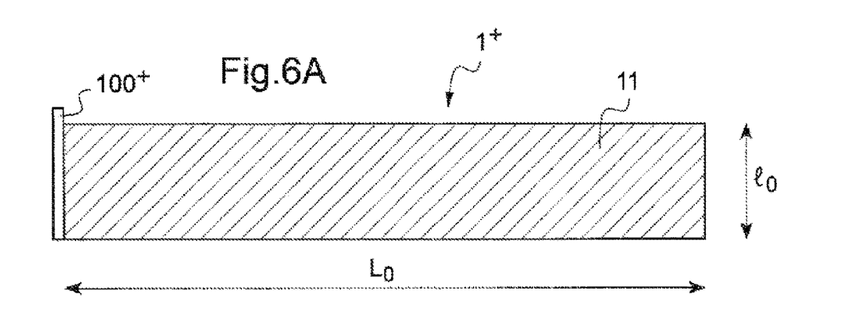
FIGS. 6A, 6B and 6C illustrate front views of a positive monopolar electrode, a bipolar-electrode device according to the invention and a negative monopolar electrode, respectively, which electrodes and device are intended to be stacked on top of one another before a winding operation according to the invention.
Figure 6B:
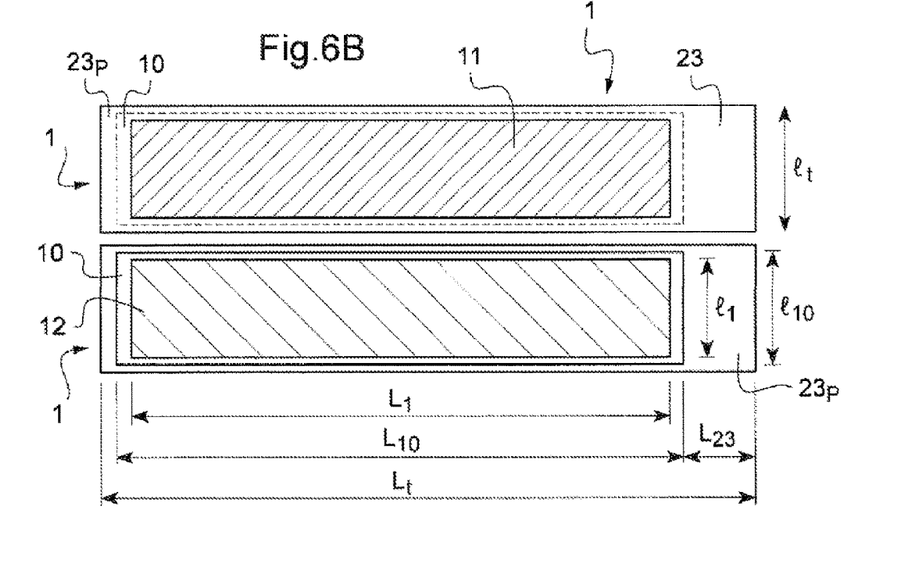

Thus, the positive monopolar electrode 1+ is coated on each of its two main faces with an active layer 11 made of LFP of area equal to 420×49 mm$^2$. A foil 100+ providing a collector terminal function is welded directly to the collector 10+ of the positive monopolar electrode 1+ (FIG. 6A). By way of example, this foil is made of aluminum and has a thickness of 100 µm and a width of 5 mm in the direction of the axis X. The foil 100+ may be welded to the current collector 10+ by electrical or ultrasonic welding.

Each of the bipolar-electrode devices 1 according to the invention has for outside width and length those of the final battery once coiled, i.e. 10*L0.

One of the faces of the collector 10 is coated with an active layer 11 made of LFP whereas the other of the faces is coated with an active layer 12 made of LTO. Their area is equal to 410×49 mm$^2$ (see L1*l1 in FIG. 6B). The collector 10 extends beyond the active areas of the electrodes 11, 12. The outside dimensions of the collector 10 are equal to 420×55 mm (see $L_{10}*l_{10}$ in FIG. 6B).

Figure 6C:
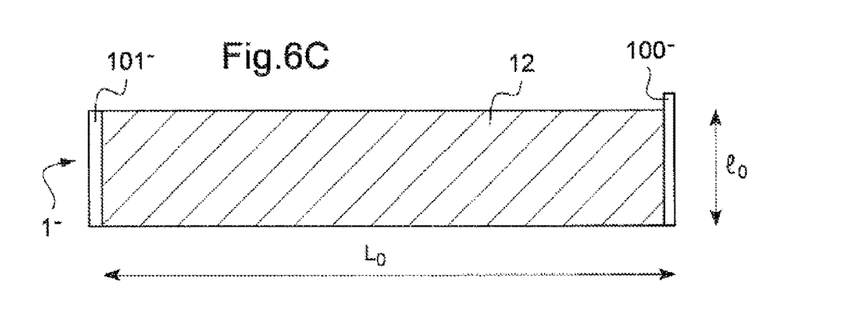

A frame 23 made of polypropylene is thermally bonded on each main face to the current collector 10 (FIG. 6C). The frame 23 has outside dimensions of 60×480 mm and inside dimensions of 50×420 mm. Thus, according to the invention, the PP frame 23 is arranged on the collector 10 such as to obtain an overshoot of enough of a length $L_{23}$ to be able to be deformed without risk of rupture during the winding. In the example, the length $L_{23}$ is equal to 50 mm. An example of a polypropylene suitable for producing the frame 23 according to the invention may be found at the following Internet address:
http://www.rs-particuliers.com/WebCatalog/Film_Etirable_Polypropylene_400mm_X_300m-183953.aspx.

The negative monopolar electrode 1− is coated on each of its two main faces with an active layer 11 made of LTO of area equal to 420×49 mm². A foil 100− providing a collector terminal function is welded directly to the collector 10+ of the positive monopolar electrode 1− (FIG. 6C). By way of example, this foil is made of aluminum and has a thickness of 100 μm and a width of 5 mm in the direction of the axis X. The foil 100− may be welded to the current collector 10− by electrical or ultrasonic welding. A zone 101− devoid of active layer, i.e. a bare zone, is provided on the end of the electrode 1− By way of example, this zone 101− has a width of 5 mm in the direction of the axis X.

For the monopolar electrodes 1+, 1− and the two devices 1, 1', 1", the electrode layers are advantageously produced using a printing technique (rotogravure, flexographic or screen printing) on the current collector 10 formed by the sheet made of 1085 aluminum.

Figure 7:
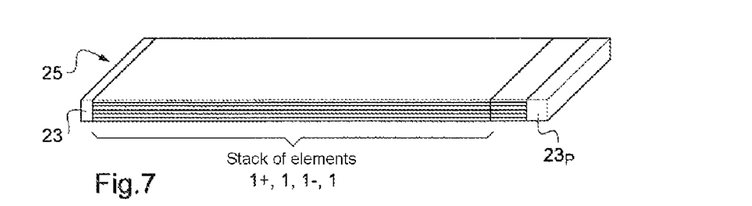
FIG. 7 is a perspective view of a stack produced from elements according to FIGS. 6A to 6C before a winding operation according to the invention.

Once the monopolar electrodes 1+, 1− and the two identical bipolar-electrode 11, 12 devices 1 have been produced, they are stacked as shown in FIG. 7, i.e. with insertion between each element 1+, 1−, 1 of a separator 24 for the liquid electrolyte. Thus, three separators 24 are interlayers and the fourth separator 24 is placed at one of the ends of the stack.

Once the stack has been produced, the two lateral peripheral portions 23P of the sealing frames 23P are heat sealed to each other over a width of 5 mm. The conditions of the heat sealing operation are the following: pressure of 1 MPa and temperature of 190° C., maintained for 3 s.

A stack 25 of the elements 1+, 1, 1−, 1, ready to be wound is then obtained (FIG. 7).

Figure 8:
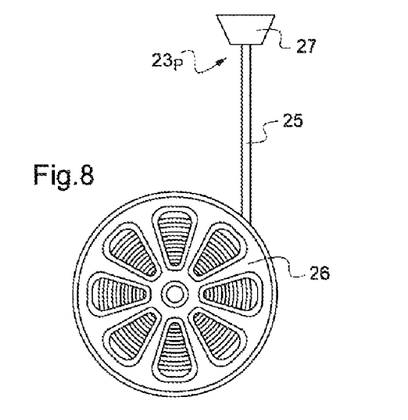
FIG. 8 schematically illustrates the coiling step according to the invention of a stack according to FIG. 7.

The stack 25 is then coiled (wound) spiraled onto a core 26 such as depicted in FIG. 8. The core 26 has a diameter of about 3.5 mm. The electrode 1+ is fastened at the moment of coiling by adhesive bonding or using an adhesive tape to the core 26 via the foil 100+. Likewise, the electrode 1− is fastened at the moment of coiling by adhesive bonding or using an adhesive tape via the bare zone 101−. The winding may be achieved by fastening, using a clamp 27, the deformable portion 23P, the length of which is dimensioned so that there is no risk of breakage (FIG. 8).

Figure 9A:
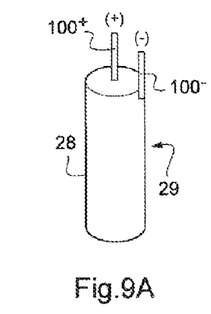
FIGS. 9A to 9D illustrate the last steps for producing a bipolar battery according to the invention once the coiling has been carried out.

Once wound, the bipolar battery 1 forms a cylindrical coil. In order to maintain it mechanically in this geometric shape, the coil is packaged using a packaging film 28 made of an electrically insulating material (FIG. 9A). By way of example, the cylinder 29 has a diameter of 17.3 mm for a height of 60 mm (FIG. 9A).

Figure 9B:
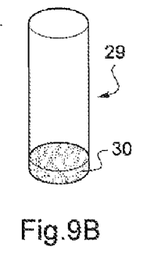

The base 30 of the cylinder 29 is heat sealed (FIG. 9B). The sealed base 30 corresponds to one of the longitudinal peripheral portions of the sealing frames 23, i.e. along the axis X before the coiling operation. The heat sealing may be carried out using a hot plate. The conditions of the heat sealing are the following: no pressure and temperature of 190° C., maintained for 3 s.

Figure 9C:
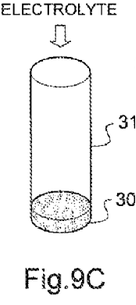

The assembly then follows the process for manufacturing a battery to standard 18650 format. The cylinder 29 the base 30 of which has been sealed is inserted into a rigid cylinder 31, usually called a case, then the case 31 is vacuum filled with a liquid electrolyte (FIG. 9C).

Figure 9D:
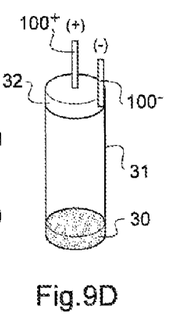

Then the top 32 of the cylinder 29, which corresponds to the other of the longitudinal peripheral portions of the sealing frames 23, is heat sealed under the same conditions (FIG. 9D). The complete seal tightness of the bipolar battery is then assured.

Lastly, the process is finalized by adding and crimping a cover (not shown) to the case 31.

A coiled bipolar Li-ion battery of standard 18650 format is thus produced, said battery delivering twice the voltage of a monopolar Li-ion battery produced to the same standard format.

The invention is not limited to the examples described above; in particular, features of the illustrated examples may be combined together in variants that are not illustrated.

It goes without saying that although the winding was described with regard to a bipolar battery comprising two initially stacked cells, it may be carried out in the same way for a battery comprising a number n of stacked cells by repeating the preceding steps with a number equal to n−2 bipolar-electrode devices 1, and two monopolar electrodes 1+, 1− as above.

The invention claimed is:

1. A bipolar battery comprising at least two electrochemical cells coiled on one another and at least one device for a lithium-ion electrochemical generator, of elongate shape along a longitudinal axis, comprising a band comprising a central portion, at least part of which is electrically conductive, forming a current collector having two main faces, at least one of the two main faces of which is covered with an electrode made of a lithium-ion insertion material, and at least two lateral peripheral portions connected to the central portion and extending primarily transversely to the longitudinal axis, the lateral peripheral portions being made of an electrically insulating material comprising at least one polymer, the insulating material of at least one of the two lateral peripheral portions being able to be elastically or plastically deformed, the dimensions of said one of the two lateral peripheral portions furthermore being defined to allow its deformation without rupture during a coiling of the band around a coiling axis that is transverse to the longitudinal axis and in proximity to the other of the two lateral peripheral portions, said one of the two lateral peripheral portions furthermore overshooting the central portion in a direction parallel to the longitudinal axis, each main face of the electrically conductive part being covered with an electrode made of a lithium-ion insertion material, in which the two lateral peripheral portions made of electrically insulating material form a peripheral zone of a wall leak-tight to the electrolytes of the two cells, which encircles said two cells.

2. The bipolar battery as claimed in claim 1, the majority polymer of the insulating material of the at least one device that is able to be deformed being chosen from a polyolefin, a nitrile rubber (NBR) and a styrene butadiene rubber (SBR).

3. The bipolary battery as claimed in claim 2, the polyolefin being chosen from a polyethylene (PE), a polypropylene (PP), a polyimide and a polyetheretherketone (PEEK).

4. The bipolar battery as claimed in claim 1, the electrically conductive part of the at least one device comprising at least one metal sheet, the lateral peripheral portions made of insulating material being sealed to said metal sheet.

5. The bipolar battery as claimed in claim 4, the metal sheet being sealed to a single frame made of an electrically insulating material that is able to be deformed, said frame completely encircling the metal sheet.

6. The bipolar battery as claimed in claim 4, the metal sheet being sealed to a frame made of an electrically insulating material having a U-shape as seen from in front, encircling the metal sheet except for the lateral peripheral portion dimensioned for its deformation, and to said lateral peripheral portion made of material able to be deformed, respectively.

7. The bipolar battery as claimed in claim 1, the band of the at least once device being made of an electrically insulating material that is able to be deformed, the electrically conductive part consisting of electrically conductive particles embedded in the band.

8. The bipolar battery as claimed in claim 7, the band of the at least one device being mechanically reinforced at its periphery, except for the lateral peripheral portion dimensioned for its deformation, by non-conductive electrical particles.

9. A process for producing a bipolar battery comprising at least two electrochemical cells coiled on one another, comprising the following steps:
   a/ producing two devices for a lithium-ion electrochemical generator, of elongate shape along a longitudinal axis, comprising a band comprising a central portion, at least part of which is electrically conductive, forming a current collector having two main faces, at least one of the two main faces of which is covered with an electrode made of a lithium-ion insertion material, and at least two lateral peripheral portions connected to the central portion and extending primarily transversely to the longitudinal axis, the lateral peripheral portions being made of an electrically insulating material comprising at least one polymer, the insulating material of at least one of the two lateral peripheral portions being able to be elastically or plastically deformed, the dimensions of said one of the two lateral peripheral portions furthermore being defined to allow its deformation without rupture during a coiling of the band around a coiling axis that is transverse to the longitudinal axis and in proximity to the other of the two lateral peripheral portions, said one of the two lateral peripheral portions furthermore overshooting the central portion in a direction parallel to the longitudinal axis, each main face of the electrically conductive part being covered with an electrode made of a lithium-ion insertion material,
   so that:
      at least one of the two faces of the electrically conductive part of one of the devices is covered with an anode made of a lithium-ion insertion material; and
      at least one of the two faces of the electrically conductive part of the other of the devices is covered with a cathode made of a lithium-ion insertion material;
   b/ stacking the two devices with insertion of a first separator, wherein each face which is not facing another face defines an end of the stack; the stacking with insertion being carried out so that an anode of one of the two devices is facing a cathode of the other device, said anode and cathode being separated by the first separator;
   c/ sealing only between the lateral peripheral portions of the bands of the two devices stacked one against the other, thus defining two sealed portions of the stack;
   d/ fastening one of the sealed portions of the stack to a coiling core so that its axis forms a coiling axis that is transverse to the longitudinal axis of the bands; and
   e/ coiling the stack in the direction of the longitudinal axis about the coiling axis, the sealed portion of the stack which is not fastened to the core being held.

10. The process as claimed in claim 9, in which each of both ends of the stack is covered with an electrode and when the two electrodes at the ends of the stack and coiled one against the other are of the same polarity, a step c1/ of covering the stack with a film made of an electrically insulating material is carried out before step d/.

11. The process as claimed in claim 9, in which each of both ends of the stack is covered with an electrode and when the two electrodes at the ends of the stack and coiled one against the other are of opposite polarity, the following steps are carried out before step d/:
   c2/ a second separator is placed on the cathode or anode made of a lithium-ion insertion material at the end of the stack; and
   c3/ the second separator is mechanically held on the stack.

12. The process as claimed in claim 9, in which once step e/ has been carried out, the following subsequent steps are carried out:
   f/ packaging of the coil using a packaging film made of an electrically insulating material in order to maintain mechanically said coil in the shape of a cylinder;
   g/ sealing the lower portion of the cylinder corresponding to one of the longitudinal peripheral portions of the bands;
   h/ inserting the cylinder with the sealed lower portion into a rigid container of complementary cylindrical shape, the rigid container forming the packaging of the battery;
   i/ impregnating the separators with a liquid electrolyte introduced into the container; and
   j/ sealing the upper portion of the cylinder corresponding to the other of the longitudinal peripheral portions of the bands.

13. The process as claimed in claim 9, each of the two terminal current collectors, which both take the form of a foil, being welded to the electrically conductive portion of one of the current collectors of the devices in step a/.

14. The process as claimed in claim 9, a bipolar battery comprising n electrochemical cells stacked individually on one another, in which steps a/ to e/ are carried out with n−2devices, n being an integer.

15. The process as claimed in claim 9, in which the deposition of each electrode made of a lithium-ion insertion material on a face of one electrically conductive part is achieved using a printing technique.

* * * * *